United States Patent [19]
Johnson et al.

[11] Patent Number: 5,868,210
[45] Date of Patent: *Feb. 9, 1999

[54] MULTI-LATERAL WELLBORE SYSTEMS AND METHODS FOR FORMING SAME

[75] Inventors: Michael H. Johnson; Joseph F. Donovan; Daniel Turick, all of Spring, Tex.

[73] Assignee: Baker Hughes Incorporated, Houston, Tex.

[*] Notice: The term of this patent shall not extend beyond the expiration date of Pat. No. 5,762,149.

[21] Appl. No.: 641,562

[22] Filed: May 1, 1996

Related U.S. Application Data

[63] Continuation-in-part of Ser. No. 469,968, Jun. 6, 1995, which is a continuation-in-part of Ser. No. 411,377, Mar. 27, 1995.

[51] Int. Cl.$^6$ ..................................................... E21B 7/08
[52] U.S. Cl. .............................. 175/40; 166/50; 166/313
[58] Field of Search ................................. 175/40, 50, 61; 166/50, 313

[56] References Cited

U.S. PATENT DOCUMENTS

| | | |
|---|---|---|
| 4,341,265 | 7/1982 | Blair, Jr. . |
| 5,145,003 | 9/1992 | Duerkensen . |
| 5,337,808 | 8/1994 | Graham ..................................... 166/191 |
| 5,353,876 | 10/1994 | Curington et al. ........................ 166/313 |
| 5,407,009 | 4/1995 | Butler et al. . |
| 5,450,902 | 9/1995 | Matthews ............................... 166/50 X |

FOREIGN PATENT DOCUMENTS 2061315  5/1981  United Kingdom .

*Primary Examiner*—William Neuder
*Attorney, Agent, or Firm*—Madan & Morris, PLLC

[57] ABSTRACT

The present invention provides multi-branched wellbore systems and methods for forming and utilizing such wellbores. An access wellbore is formed substantially in a non-producing formation. From the access wellbore are drilled one or more branch wellbore into producing formations and into non-producing formations. Additional branch wellbores may be formed from the access wellbore or the branch wellbores. Seals between the access wellbore and the production wellbores are formed outside the hydrocarbon-bearing formations. Flow control devices and other devices are installed outside the access wellbore, thereby utilizing the access wellbore primarily for transporting fluids during production of hydrocarbons. The distance between the access wellbore and any other desired formation, such as the producing formations, is determined during drilling of the access wellbore, preferably by utilizing acoustic sensors deployed in a drilling assembly. The distance between the access wellbore and the various formations is utilized for adjusting the drilling path of the access. The branch wellbores may be utilized for storing equipment, processing and/or treating fluids, compressing gas, and redirecting gas and water downhole to improve hydrocarbon production.

57 Claims, 8 Drawing Sheets

5,868,210

MULTI-LATERAL WELLBORE SYSTEMS AND METHODS FOR FORMING SAME

CROSS-REFERENCE TO RELATED APPLICATIONS

This application is a continuation-in-part of the U.S. patent application Ser. No. 08/469,968, filed Jun. 6, 1995, which is a continuation-in-part of Ser. No. 08/411,377, filed on Mar. 27, 1995.

BACKGROUND OF THE INVENTION

1. Field of the Invention

This invention relates generally to wellbore construction and more particularly to methods for forming multi-branched wellbores from one or more access wellbore. At least one access wellbore is formed substantially in non-producing subterranean formations. This invention also relates to methods of utilizing such wellbores, including utilizing the branch wellbores for storing various devices and materials and for performing certain operations in the branch wellbores. This invention further relates to an apparatus and method for transporting equipment and materials from a source location to a desired wellbore or between different wellbores.

2. Background of the Art

To obtain hydrocarbons such as oil and gas, boreholes or wellbores are drilled from one or more surface locations into hydrocarbon-bearing subterranean geological strata or formations (also referred to in the industry as the reservoirs). A large proportion of the current drilling activity involves drilling highly deviated and/or substantially horizontal wellbores extending through the reservoir. Typically, to drill a horizontal wellbore into a desired formation, the wellbore is drilled from a surface location vertically into the earth for a certain depth. At a predetermined depth, the wellbore is dog-legged into a desired direction so as to reach the desired formation, which is usually the target hydrocarbon-bearing or producing formation. The wellbore is drilled horizontally into the producing formation to a desired length. Additional dog-legged wellbores from the same vertical wellbore are also drilled in some cases. Some horizontal boreholes extend several thousand meters into the reservoirs. In most cases, however, a single horizontal wellbore, generally referred herein as the primary wellbore, main wellbore or access wellbore, is drilled to recover hydrocarbons from different locations within the reservoir. More recently, branch wellbores from the main wellbore that extend into selected areas of the producing formation or reservoir have been drilled to increase production of hydrocarbons from the reservoir and/or to maximize the total hydrocarbon recovery from the reservoir. Such a branch wellbore herein is referred to as a lateral wellbore and a plurality of such branch wellbores extending from a wellbore are referred to as multi-lateral or multi-branched wellbores.

The primary wellbore and the multi-lateral wellbores are generally drilled along predetermined wellbore paths, which are usually determined or plotted based on existing data, such as seismic data and drilling data available from previously drilled wells in the same or similar formation. Resolution of such data is relatively low. To drill such wellbores, operators typically utilize a drill string which contains a drilling device and a number of measurement-while-drilling ("MWD") devices. The drilling device is used to disintegrate the subsurface formations and the MWD devices are used for determining the properties of the formations and for determining the downhole drilling conditions. Operators utilize the information to adjust the drilling direction.

In many cases it is desirable to form a primary wellbore in a non-producing formation and then drill branch or lateral wellbores from the primary wellbore into the target formation. In such cases, it is highly desirable to place the primary wellbore along an optimum wellbore path which is at a known distance from the boundary of the target formations. Prior art typically utilizes seismic data and prior wellbore data to decide upon the path for the primary wellbore. The resolution of such data is relatively poor. Wireline tools can be run to obtain the necessary bed boundary information. Wireline systems require stopping the drilling operations for several hours and are thus not very desirable. None of the prior art systems provide in-situ determination of the location of the boundary of the target producing formations relative to the wellbore being drilled. It is, thus, desirable to determine relatively accurately the location of the boundary of the target formation relative to the primary wellbore while drilling the primary wellbore. Such information can then be utilized to adjust the drilling direction to adjust the drilling direction to form the wellbore along an optimum wellbore path.

As noted above, current drilling methods and systems do not provide in-situ methods for determining the position of the target formation bed boundary relative to a primary wellbore that is drilled in a non-producing formation along the target formation. Current directional drilling systems usually employ a drill string having a drill bit at its bottom that is rotated by a motor (commonly referred to as the "mud motor"). A plurality of sensors and MWD devices are placed in close proximity to the drill bit to measure certain drilling, borehole and formation evaluation parameters. Typically, sensors for measuring downhole temperature and pressure, azimuth and inclination measuring devices and a formation resistivity measuring device are employed to determine the drill string and borehole-related parameters. However, none of these systems allow drilling an access wellbore at a known distance from the wellbore that is determined and adjusted while the access wellbore is being drilled.

U.S. patent application Ser. No. 60/010,652, filed on Jan. 26, 1996, which is assigned to the assignee of the present application and which is incorporated herein by reference, provides a system for drilling boreholes wherein the downhole subassembly includes an acoustic MWD system in which a first set of acoustic sensors is utilized to determine the acoustic velocities of the borehole formations during drilling and a second set of acoustic sensors for determining bed boundary information based on the formation acoustic velocities measured downhole. Isolators between the transmitters and their associated receivers serve to reduce the body wave and tube wave effects. The present invention preferably utilizes the system disclosed in the U.S. patent application Ser. No. 60/010,652 to determine the location of the bed boundary of the target reservoir relative to the primary access wellbore while drilling the primary access wellbore. The drilling direction or path of the primary wellbore is adjusted based on the bed boundary information to place the primary access wellbore at optimum distance from the target formation. Since the location of the primary wellbore is relatively accurately known in relation to adjacent formations, it enables drilling branch wellbores along optimum paths into the target formation and the non-producing formations.

In the prior art primary wellbores, a number of devices are placed to facilitate production of hydrocarbons and to perform workover services. Such devices occupy space in the primary wellbore, which may be utilized for improving the overall efficiency of the wellbore system. Such primary wellbores are expensive to construct, are relatively inefficient in transporting hydrocarbons and are obstructive if major workover is required after the completion of such wellbores. It is desirable to have branch wellbores for storing various types of equipment and materials downhole, including retrievable devices which may be utilized for performing downhole operations. It is also desirable to leave the primary wellbore substantially free of any equipment and materials which may be placed outside the main wellbore and to utilize the main wellbore primarily for transporting fluids during the production of hydrocarbons. This may be accomplished by storing certain devices in the storage wellbore and by installing the fluid flow control devices entirely in the individual branch wellbores.

It is a common practice to form a seal around an area at the intersection of the primary wellbore and the branch wellbores. The seal is usually formed between the intersecting wellbores and the formation. Since the prior art branch wellbores are formed from the primary wellbores placed in the producing formations, the seals are formed entirely within such producing formations. Seals formed in the producing formations tend to be less durable because such formations typically are relatively porous and also because of the presence of depleting hydrocarbons. It is therefore desirable to form such seals entirely within the non-producing formations.

U.S. patent application Ser. No. 08/411,377, filed Mar. 27, 1996 and Ser. No. 08/469,968, filed Jun. 6, 1995, both assigned to the assignee of this application, which are incorporated herein by reference in their entirety, disclose forming branch wellbores from a primary wellbore, wherein some of the branch wellbores are drilled outside producing formations or the reservoirs for storing chemicals for treating the hydrocarbons downhole and for re-injecting water into secondary formations. Such wellbore construction solves some of the problems with the above-noted prior art wellbore. However, these methods do not provide wellbores for storing retrievable devices therein which may be utilized downhole at a later time, such as for performing completion operations, perforating, or performing workover tasks or transferring certain chemicals from such storage wellbores to another location downhole during the drilling of branch wellbores or at a later time, such as after the hydrocarbon production has started. Additionally, such wellbores do not provide for forming seals which lie outside the producing wellbores or primary wellbores which are utilized primarily for transporting fluids during the production phase.

The present invention addresses the above-noted problems associated with formation and use of multi-lateral wellbores and provides methods for forming multi-lateral wellbores from a primary wellbore which is formed substantially in a non-producing formation. The distance between the primary wellbore and the target formations is determined while drilling the primary wellbore, preferably by acoustic methods. The drilling path of the primary wellbore is altered or adjusted based on the in-situ distance measurements to place the primary wellbore along an optimum path. The lateral wellbores are drilled from the primary wellbore in the non-producing formations and producing formations. Seals are formed at the intersection of the lateral wellbores and primary wellbore entirely in the non-producing formation. Lateral wellbores are utilized for a variety of purposes, including for storing equipment and for processing and treating fluids downhole. Fluid flow control devices are placed outside the primary wellbore. The primary wellbore is utilized primarily for flowing the hydrocarbons.

SUMMARY OF THE INVENTION

The present invention provides methods and systems for forming multi-lateral wellbores. In one method, a primary or access wellbore is formed substantially in a non-producing formation. At least one production branch wellbore is formed from the access wellbore into a hydrocarbon-bearing formation for recovering hydrocarbons from such a formation. At least one branch wellbore is formed for storing retrievable apparatus which may be utilized later for performing an operation downhole. Additional lateral wellbores may be formed from the access wellbore or the branch wellbores for storing therein materials and equipment which may be utilized downhole later. One such branch wellbore may be formed for storing certain chemicals that are selectively discharged into the hydrocarbons during production. Another branch wellbore may be formed to contain a fluid separation system for separating downhole hydrocarbons into different phases or for separating hydrocarbons from other fluids such as water.

The present invention provides for forming seals between the access wellbore and the production wellbores entirely in the non-hydrocarbon bearing formations. Additionally, flow control apparatus for controlling fluid flow from the producing formations through the production branch wellbores may be located entirely outside the access wellbore to facilitate the fluid flow through such production branch wellbores.

The production branch wellbores and other branch wellbores are completed. Hydrocarbons then flow from the producing formations into their associate production wellbores. Such multi-lateral wellbore construction allows utilizing the access wellbore for primarily transporting fluids during production of hydrocarbons and provides more access space for remedial and or service operations.

In another method of the present invention, the distance between the access wellbore and the producing formations is determined during the drilling of the access wellbore. In one method acoustic sensors deployed in a drilling assembly are utilized for determining the distance between the access wellbore and the desired formations. In an alternative method seismic measurement are utilized for determining such distance while drilling the access wellbore. The distance determined may be utilized for adjusting the drilling path of the access wellbore either from the surface or by deploying devices that would automatically adjust the drilling direction based on the computed distance.

The methods of the invention provide for retrieving the stored devices in the branch wellbores for performing a function downhole. The stored devices may include devices for drilling wellbores, for perforating wellbores, for performing wellbore completion operations, for performing workover operations and for taking wellbore measurements.

The present invention further provides a system for transporting devices or materials to and from any desired branch wellbore.

Examples of the more important features of the invention have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DETAILED DESCRIPTION OF PREFERRED EMBODIMENTS

Figure 6:
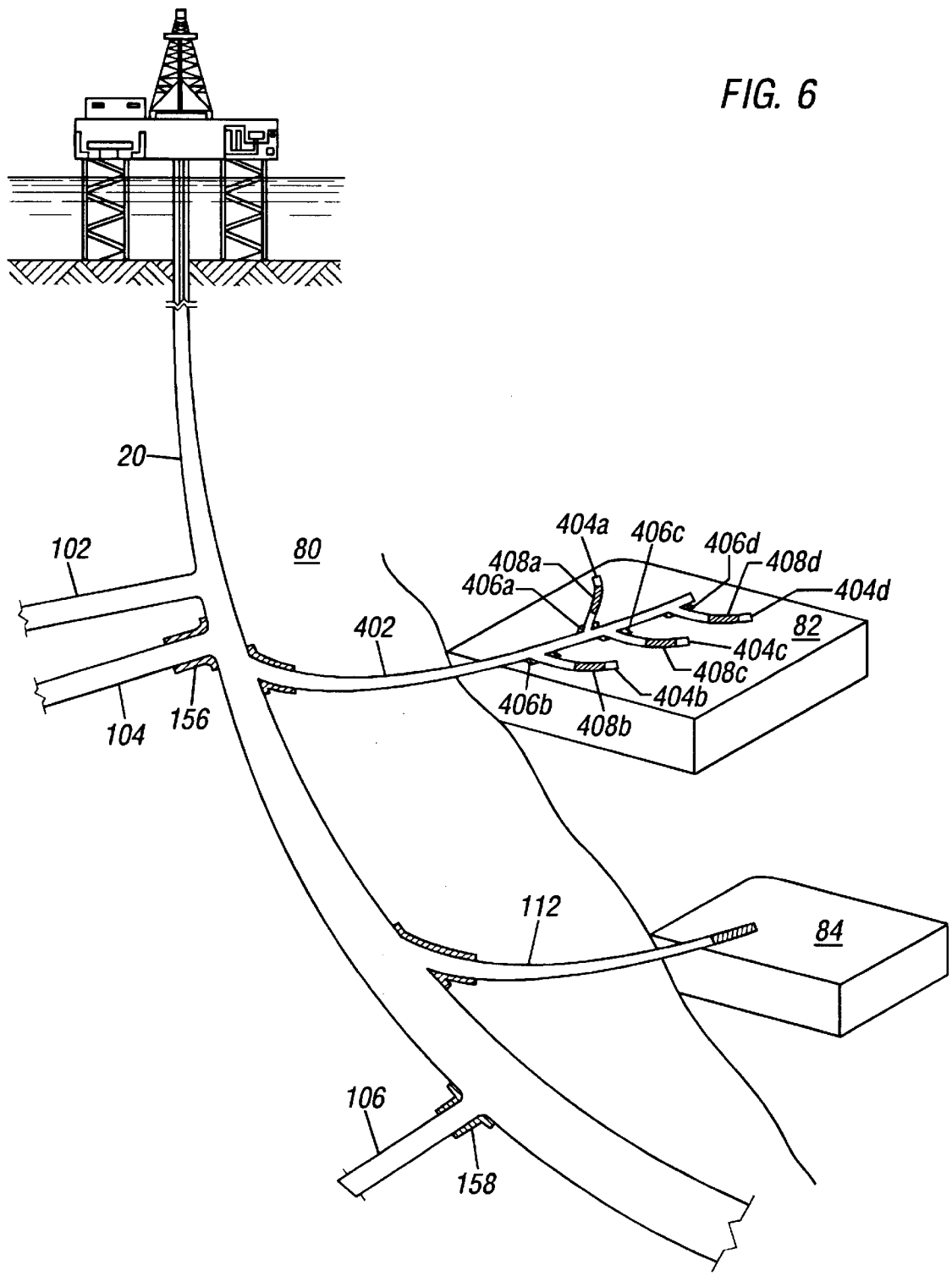
FIG. 6 is a schematic diagram showing the formation of interconnecting access wellbores in a non-producing and producing formation, wherein lateral production wellbores are formed from the access wellbore in the producing formation.
Figure 7:
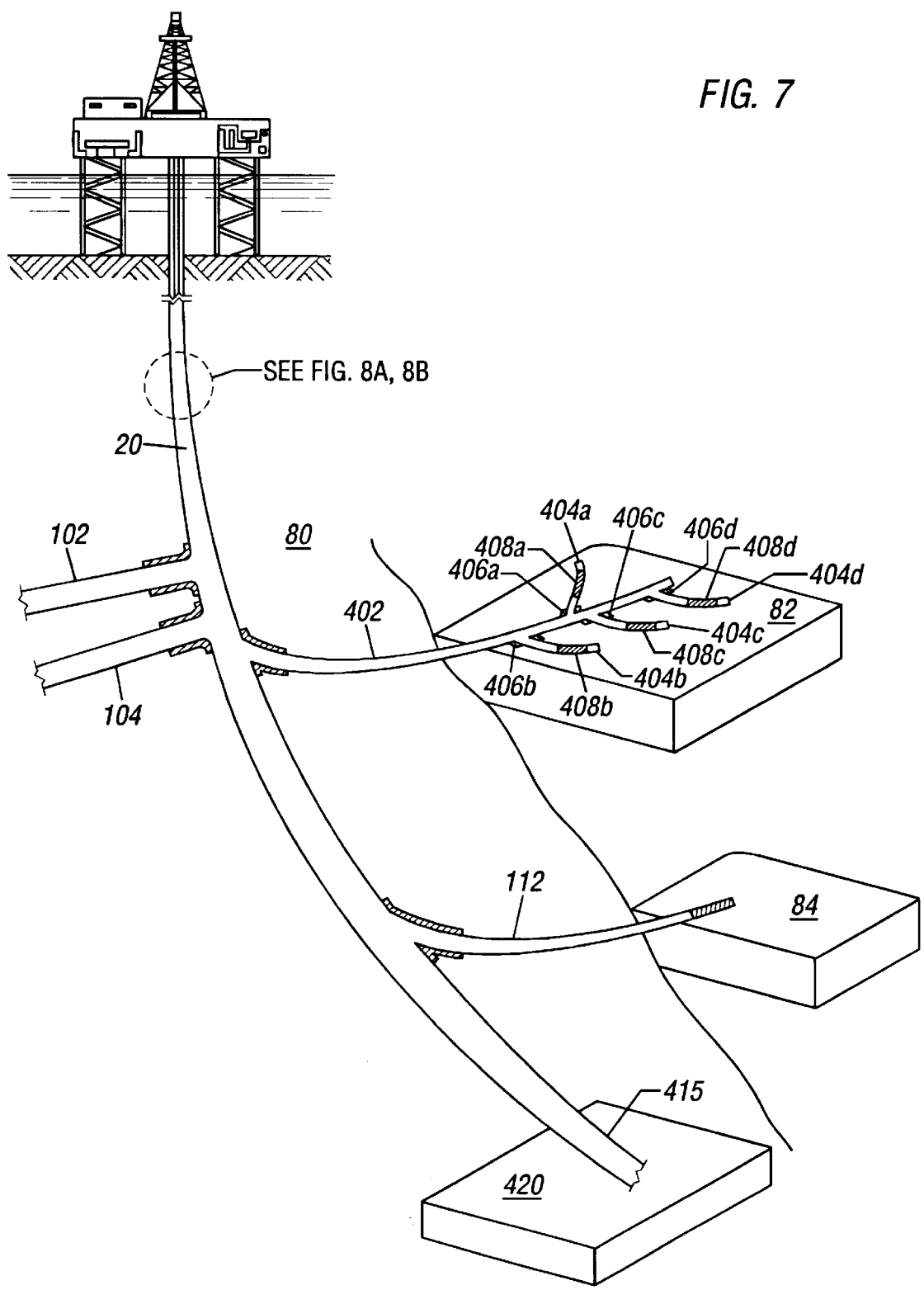
FIG. 7 is a schematic diagram showing a primary access wellbore which avoids certain producing formations and which is drilled into a certain producing formation.

In general, the present invention provides methods and systems for forming multi-lateral wellbores from one or more primary access wellbores. FIGS. 1–5 illustrate the formation of lateral wellbores from an access wellbore that is formed primarily in a non-producing formation. FIGS. 6 and 7 illustrate examples of forming branch wellbores from access wellbores formed in both a non-producing and a producing formation. Branch wellbores made from a single access wellbore are first described followed by the formation of branch wellbores from multiple access wellbores. Apparatus and method for transporting devices and materials into the wellbores is described thereafter.

Figure 1:
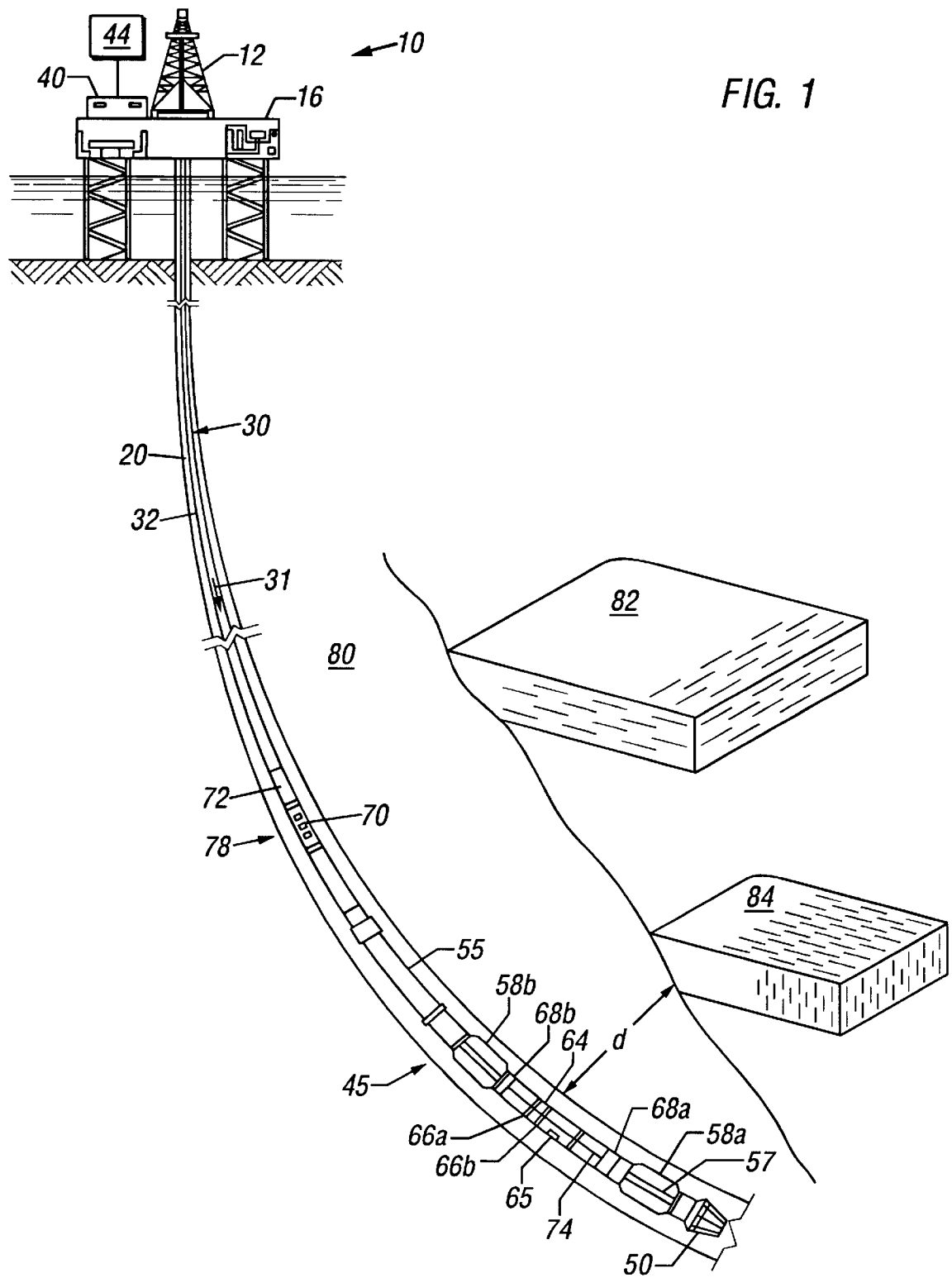
FIG. 1 shows a schematic illustration of forming an access wellbore in a non-producing formation while determining the location of the target formations relative to the access wellbore.

FIG. 1 shows a schematic diagram of a preferred drilling system 10 for drilling wellbores offshore. The drilling system 10 includes a drilling platform 12, a drill string 30 having a drilling apparatus and various measurement-while-drilling ("MWD") devices at its bottom end. The combination of the drilling apparatus and the MWD devices are sometimes referred to herein as the "downhole assembly" or the "bottomhole assembly" or "BHA" and is denoted numeral 45. The bottomhole assembly 45 is utilized for drilling an access wellbore 20 through the subterranean formations and for making measurements relating to the subsurface formations and drilling parameters during the drilling of the access wellbore 20. The drilling platform 12 includes a derrick 14 erected on a floor 16 which supports a rotary table rotated by a prime mover (not shown) at a desired rotational speed. The drill string 30 includes a tubing 32 that extends downward from the rotary table into a primary or main access wellbore 20. A bottomhole assembly 45 is attached to the bottom end of the tubing 32 for drilling the wellbore 20. The drill string 30 is coupled to a drawworks via a kelly joint, swivel and line through a system of pulleys to hold the drill pipe 32. Such elements are well known in the art for forming wellbores and are, thus, not shown or described in any detail.

A control unit 40 is preferably placed on the platform 12. The control unit 40 receives signals from the MWD devices and other sensors placed downhole and on the surface, processes such signals, and aids in controlling the drilling operations according to programmed instructions. The surface control unit 40 includes devices for displaying desired drilling parameters and other information, which information is utilized by an operator to control the drilling operations. The surface control unit 40 contains a computer, memory for storing data, data recorder and other peripherals. The surface control unit 40 also includes models and processes data according to programmed instructions and responds to user commands entered through a suitable device, such as a keyboard. A number of alarms 44 are coupled to the control unit 40, which selectively activates such alarms when certain unsafe or undesirable operating conditions occur. Such control systems are known in the art and, thus, are not described in detail.

The bottomhole assembly 45 preferably includes a drill motor or mud motor 55 coupled to a drill bit 50 via a drive shaft (not shown) disposed in a bearing assembly 57 for rotating the drill bit 50 when a fluid 31 is passed through the mud motor 55 under pressure. A lower stabilizer 58a is provided near the drill bit 50, which is preferably placed over the bearing assembly 57, to acts as a centralizer for the lowermost portion of the bottomhole assembly 45. Additional stabilizers, such as a stabilizer 58b, are suitably placed along the bottomhole assembly for providing lateral support to the bottomhole assembly 45 at desired locations.

Still referring to FIG. 1, the BHA preferably contains a formation resistivity device 64 for determining the formation resistivity near and in front of the drill bit 50, a gamma ray device 65 for measuring the formation gamma ray intensity and an inclination measuring device (inclinometer) 74 for determining the inclination and azimuth of the bottomhole assembly 45. The resistivity device 64 contains one or more pairs of transmitting antennae 66a and 66b spaced from one or more pairs of receiving antennae 68a and 68b. Magnetic dipoles are employed which operate in the medium frequency and lower high frequency spectrum. In operation, the transmitted electromagnetic waves are perturbed as they propagate through the formation surrounding the resistivity device 64. The receiving antennae 68a and 68b detect the perturbed waves. Formation resistivity is derived from the phase and amplitude of the detected signals. Signals from these devices and other sensors are processed by a downhole circuit and transmitted to the surface control unit 40 preferably a suitable two-way telemetry system 72.

The inclinometer 74 and the gamma ray device 76 are preferably placed along the resistivity measuring device 64 for respectively determining the inclination of the portion of the drill string near the drill bit 50 and the formation gamma ray intensity. Any suitable inclinometer and gamma ray device may be utilized for the purposes of this invention. In addition, an azimuth device (not shown), such as a magnetometer or a gyroscopic device, may be utilized to determine the drill string azimuth. Such devices are known in the art and, thus, are not described in detail herein. In the above-described configuration, the mud motor 55 transfers power to the drill bit 50 via one or more hollow shafts that run through the resistivity measuring device 64. The hollow shaft enables the drilling fluid to pass from the mud motor 55 to the drill bit 50. In an alternative embodiment of the drill string 20, the mud motor 55 may be coupled below resistivity measuring device 64 or at any other suitable place.

The downhole assembly 45 preferably includes a section 78 which contains an acoustic system 70 for determining the distance between the access wellbore 20 and adjacent formations, such as target or producing (hydrocarbon-bearing) formations 82 and 84. Producing formations are also referred herein as reservoirs. The acoustic system contains transmitters and one or more sets of receivers (not shown). The system is adapted to transmit acoustic signals at a desired number of frequencies or by sweeping frequencies in a given range. The transmitted acoustic signals reflect from the formations 82 and 84 and the reflected signals are detected by the receivers. The detected signals are processed to determine the distance "d" between the access wellbore and the target formations. The frequencies of the transmitted signals are chosen to obtain a desired depth of investigation and the resolution. Such a method enables in-situ determinations of the distance between the bed boundaries of the target formations 82 and 84 from the bottomhole assembly 45.

U.S. patent application Ser. No. 60/010,652, which is assigned to the assignee of this invention and which is incorporated herein by reference in its entirety, discloses an acoustic system for determining the bed boundaries from a bottomhole assembly. The present invention preferably utilizes such an acoustic system for determining the distance d. The present invention, however, may utilize any other known system for determining the bed boundary information. Such systems may include seismic methods in which receivers are deployed in drill string or the BHA and a source is placed at the earth's surface or vice versa.

Still referring to FIG. 1, the section 78 also includes devices for determining the formation density, formation porosity and other desired formation evaluation parameters. The section 78 is preferably placed above the mud motor 55. Such devices are known in the art and the present invention may utilize any such devices. These devices also transmit data to the downhole telemetry system 72, which in turn transmits the received data uphole to the surface control unit 40. The downhole telemetry system 72 also receives signals and data from the uphole control unit 40 and transmits such received signals and data to the appropriate downhole devices. The present invention preferably utilizes a mud pulse telemetry technique to communicate data from downhole sensors and devices to the control unit 40 during drilling operations. Any other communication system also may be utilized.

Still referring to FIG. 1, in one method of forming wellbores, the drilling system 10 is utilized to drill the access wellbore 20 through a non-producing or non-hydrocarbon-bearing formation 80 along a predetermined wellbore path a certain distance from the hydrocarbon-bearing formations, such as formations 82 and 84. Such a predetermined wellbore path is typically defined based on prior information, such as seismic data and data relating to prior wellbore formed in the same or nearby geological formations. During the drilling of the access wellbore 20, the acoustic device 70 continually determines the distance d between the wellbore 20 and the target formations 82 and 84. As noted earlier, prior art systems do not attempt to drill the access wellbores primarily in a non-producing formation and also do not determine the relative location of the target formations while drilling the access wellbore. In the present invention, the bed boundary information obtained by the bottomhole assembly 45 is preferably utilized to adjust the drilling direction of the access wellbore 20 from the surface or by deploying self-adjusting apparatus downhole that may be controlled from the surface or which is self-actuating based on the distance d determined by the bottomhole assembly 45 and the desired distance. Such method enable drilling the access wellbore along an optimal wellbore path and enables adjusting the drilling path bases on relatively accurate in-situ measurements taken during the drilling operations.

Typically, the access wellbore, such as the wellbore 20, is substantially larger than the lateral wellbores that are to be drilled from the access wellbore. Therefore, access wellbores require use of large rigs, which are expensive to operate. Therefore, it is desirable to first drill the access wellbore to a sufficient distance from the surface and then drill lateral wellbores by utilizing smaller rigs, which are usually referred to as the workover rigs.

Figure 2:
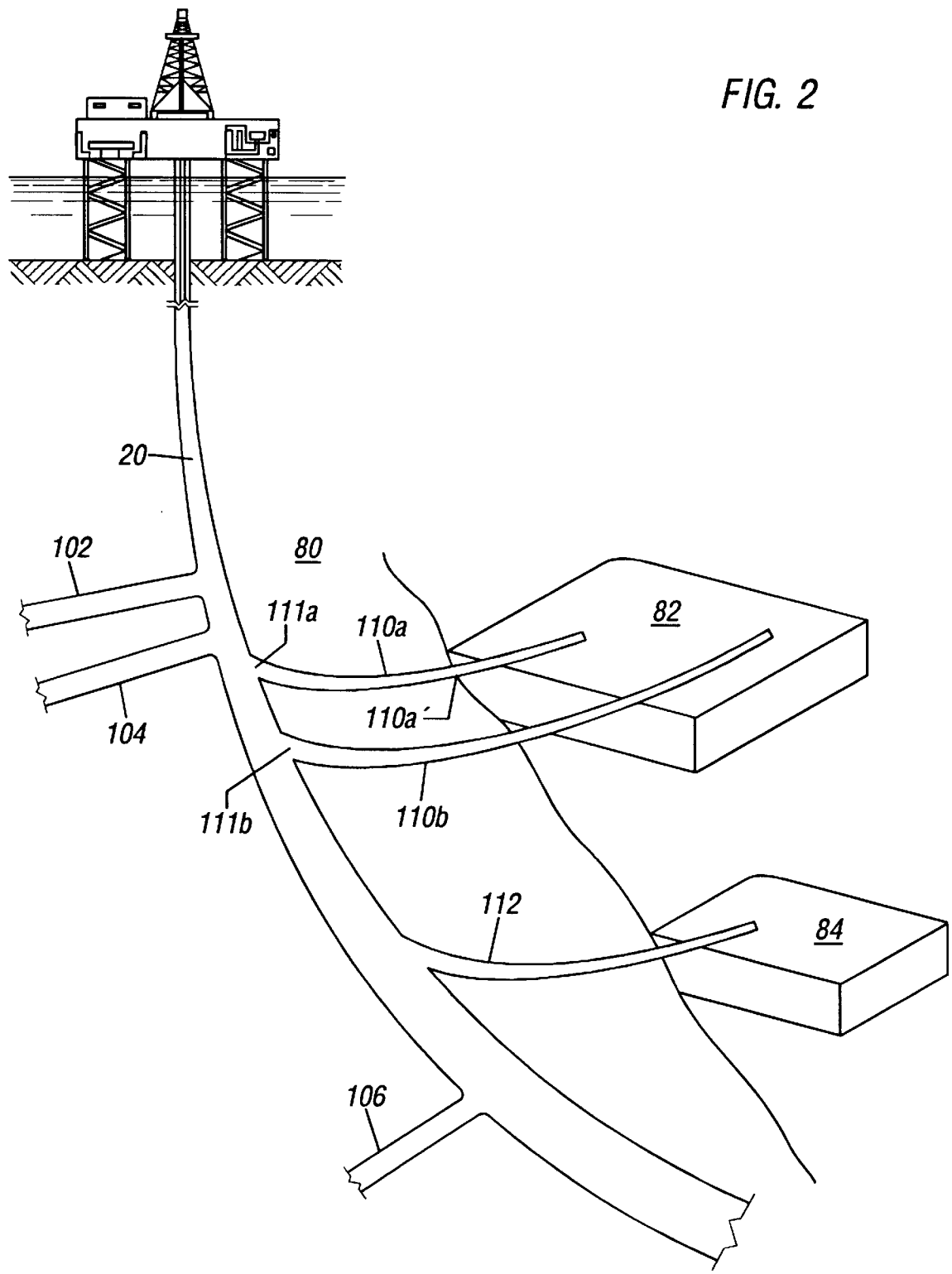
FIG. 2 is a schematic diagram showing the formation of lateral wellbores formed from the primary access wellbore at selected places into the non-producing and producing formations.

The access wellbore 20 is preferably formed entirely or substantially entirely in non-producing formations for reasons which are more fully explained later. Once the access wellbore 20 has been formed to a desired depth, a desired number of non-production lateral or branch wellbores are formed from the access wellbore 20. As an example and not as a limitation, FIG. 2 shows an example of forming non-production branch wellbores. Non-production branch wellbores 102, 104 and 106, each having a desired reach or depth, are shown formed from the access wellbore 20 into the non-producing formation 80. Wellbores 102, 104 and 106 respectively intersect the wellbore 20 at locations 103, 105, and 107. The non-production branch wellbores may also be formed from production branch wellbores 1 10 and 1 12. The non-production wellbores may be utilized for a variety of purposes as explained in more detail later with reference to FIGS. 4 and 5.

It is desirable to form the branch wellbores in a non-producing formation because they usually are less porous than the producing formations and are, thus, harder than the producing formations. The non-producing formations, thus, enable forming stronger and more durable wellbores less expensively. Some of such wellbores, however, may be formed in the producing formations. In addition to the desired non-production wellbores 102, 104, and 106, a desired number of production wellbores are formed from the access wellbore 20 into the producing formations 82 and 84. As an example, and not as any limitation, FIG. 2 shows the formation of two production wellbores 110*a* and 110*b* respectively from locations (points of intersection) 111*a* and 111*b* at he access wellbore 20 into the producing formation 82. Similarly, a production branch wellbore 112 is formed from the access wellbore 20 into the producing formation 84. Knowing the distance of the producing formations 82 and 84 from the access wellbore 20 enables planning and drilling the branch wellbores 110*a*, 110*b* and 112 along optimum wellbore paths.

It is known in the art that it is desirable to drill the wellbores in the producing formations, such as formations 82 and 84, with a drilling fluid that is different from the fluid utilized for drilling the wellbores or portions thereof in the non-producing formations. This is due to the fact that commonly used drilling fluids for drilling wellbores through the non-producing formations can cause productivity impairment in the producing formations. If this occurs, this usually requires stimulating the formation to allow the producing formation to reach its maximum potential.

The fluids used for drilling in the producing formations are referred to in the art as the "drill-in" fluids. Current methods require having two complete fluid systems. The wellbore fluid is changed each time a wellbore is drilled into a producing formation. For example, in the example of FIG. 2, the drilling fluid would be changed when the branch wellbore 110a is drilled past the location 110a'. The drilling fluid will again be changed when the branch wellbore 110a has been drilled to drill the access wellbore 20 past the branch wellbore 110a. Thus, for the purpose of this invention, it is preferred that the wellbores, both the access wellbore and the branch wellbores, first be formed in the non producing formations to the extent practical by utilizing one type of drilling fluid and then changing the fluid to drill the branch wellbores in the producing formations. Thus, the present invention requires changing the drilling fluid only once, i.e., after the access wellbore and other branch wellbores have been drilled into the non-producing formations to the extent practical.

Figure 3:
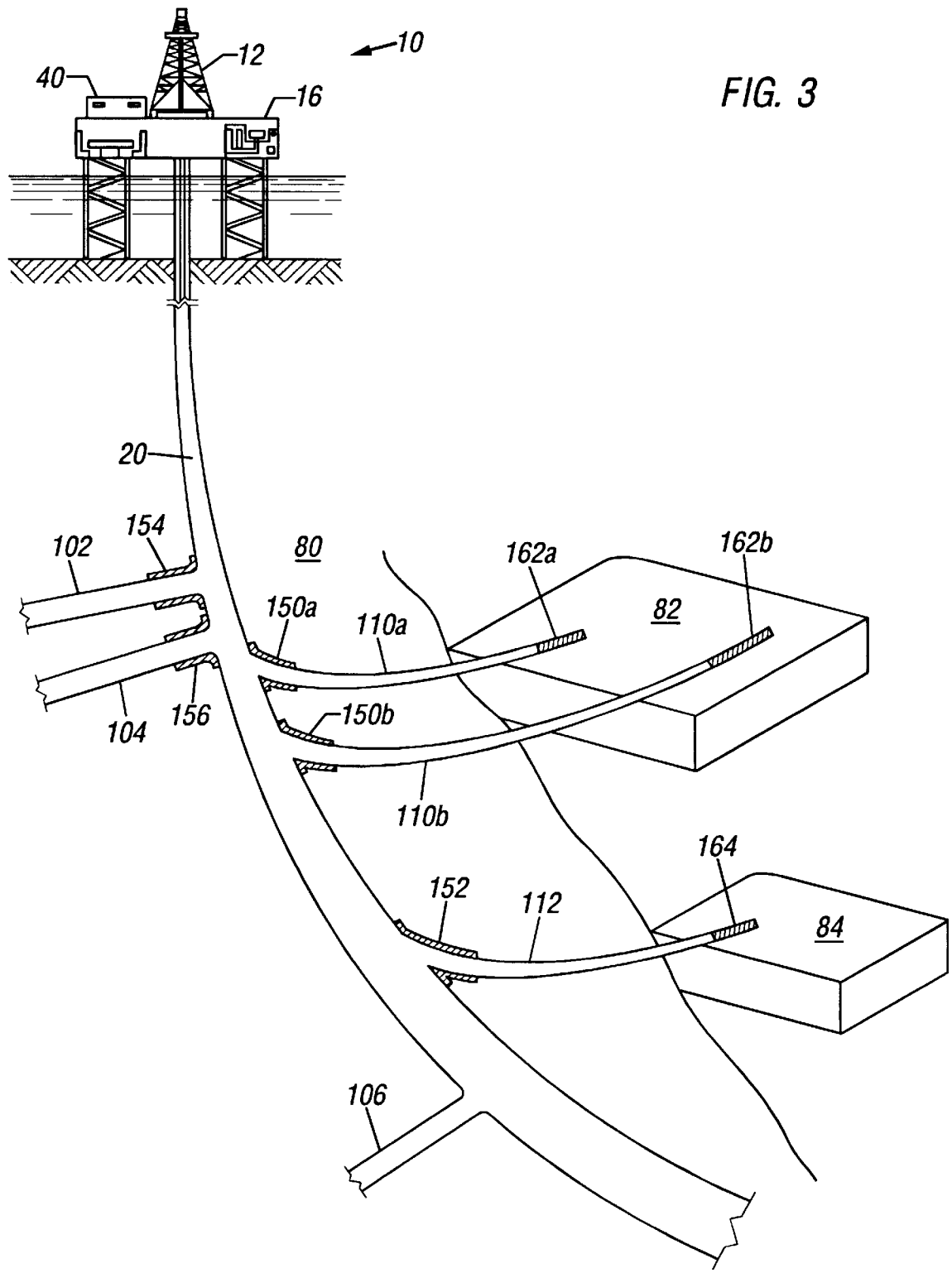
FIG. 3 is a schematic diagram showing the formation of seals at the intersection of the primary wellbore and the branch wellbores that are placed entirely in the non-producing formation.

After drilling the branch wellbores as described above, seals are formed at respective branch wellbore junctions with the access wellbore 20. FIG. 3 shows the formation of such seals. As shown, seals 154 and 156 are respectively formed at the intersection of the access wellbore 20 and the non-production branch wellbores 102 and 104. It may be desirable not to form any seal between certain branch wellbores and the access wellbore 20 as shown for the branch wellbore 106. Similarly, seals are formed between the access wellbore 20 and the production branch wellbores 110a, 110b and 112. As noted earlier, since the rocks are usually harder in the non-producing formations, such as the formation 80, it is preferred that the seals for the production wellbores, such as wellbores 110a, 110b and 112, are formed entirely in the non-producing formation 80. Such seals are easier to form and are more durable. Various types of seals and methods of forming seals are known in the oil and gas industry. For the purpose of this invention any such seals may be formed.

Still referring to FIG. 3, the production wellbores are completed at desired zones. For example, wellbore 110a is completed at zone 162a for producing hydrocarbons from the formation 82. Additionally, the wellbore 110b is completed at two locations 162b' and 162b" for producing additional hydrocarbons from the formation 82. Similarly, wellbore 112 is shown completed at a zone or location 164 for producing hydrocarbons from the formation 84. It should be noted that any number of wellbores may be formed in each of the producing formations and each such wellbore may be completed at any number of zones for optimizing the production of hydrocarbons therefrom. Furthermore, any known suitable completion method may be utilized for performing completion operations.

Figure 4:
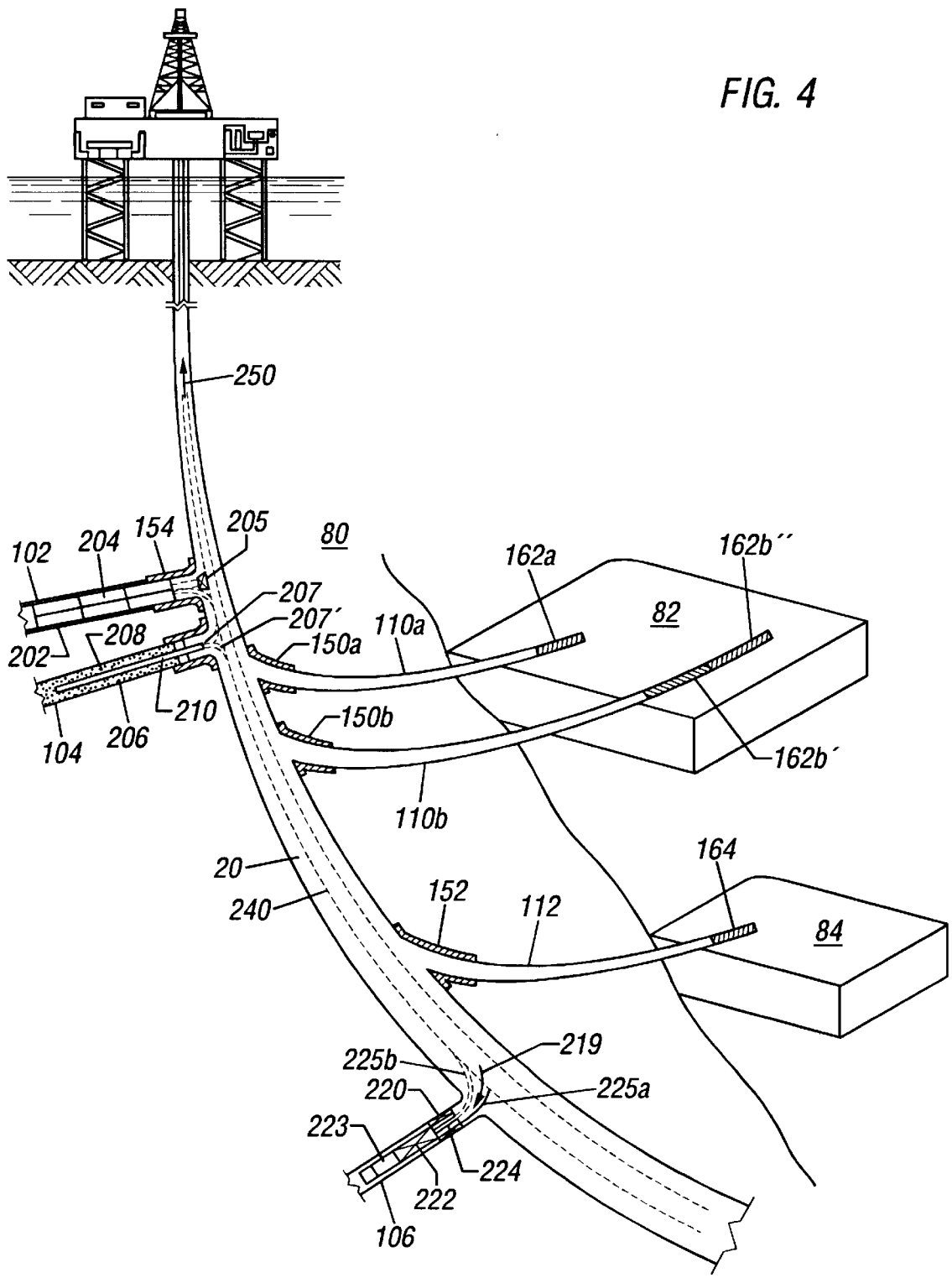
FIG. 4 shows the placement of retrievable devices in a branch wellbore, chemicals in a separate branch wellbore and processing apparatus in yet another separate branch wellbore, thereby enabling utilizing the access wellbore primarily or entirely for flowing fluids therethrough.

FIG. 4 shows the completion of non-production wellbores 102, 104 and 106 and some examples of how such wellbores may be utilized. Wellbore 102 is shown to contain a liner or casing 202 for protecting the wellbore from collapsing. In certain hard formations and/or certain shallow wellbores, it may not be necessary to use such methods for protecting the wellbore. In FIG. 4, wellbore 102 is shown as a place for storing devices. The stored devices are denoted generally by numeral 204. Once the desired number of storage wellbores, such as wellbore 102, have been suitably completed, devices 204 may be conveyed into and retrieved therefrom as desired. As shown in FIG. 4, devices 204 may be conveyed into the storage wellbores 102 via a casing 240 placed in the access wellbore 20 and a suitable closable opening 205 between the access wellbore 102 and the casing 240 by a suitable conveying mechanism, such as a coiled tubing. The devices 204 may be retrieved from the wellbore 102 for performing a suitable operation downhole. Examples of the devices that may be stored in the storage wellbores include: (a) drilling devices, such as bottomhole assembly having a drill bit coupled to a drilling motor for performing drilling operations, (b) measurement-while-drilling devices known in the art and/or other sensors for use in determining formation, drilling, wellbore and production parameters, (c) devices for use in completing wellbores, (d) perforating devices, (e) packers, and (f) other devices that may be utilized downhole during the formation of the wellbores described above and/or for later use during the production of hydrocarbons from the target formations.

Still referring to FIG. 4, the stored device 204 may be remotely controlled from the surface to cause the stored device 204 to move from the storage wellbore 102 to perform a predetermined function or work downhole within one of the wellbores. The stored device 204 may be self-propelled and may be activated from a remote location. Still, the remote device 204 may be of type that self-actuates upon the occurrence of a predetermined condition and directs or causes itself to move from the storage wellbore 204 to perform a predetermined operation downhole.

Still referring to FIG. 4, the non-production branch wellbore 104 is shown completed by placing a casing 206 therein. This wellbore is shown to house materials 208, which may be utilized for processing or treating fluids downhole. The stored materials 208 may include chemicals and/or biological masses (enzymes). The chemicals and/or biological masses may be utilized for treating downhole fluids to alter the viscosity, to change the chemical composition or chemical make-up of fluids downhole, i.e., in one of the wellbores. In practice, to treat the downhole fluids with the stored materials, such materials may be controllably released into the access wellbore 20 through a release path 210 and a suitable control device 207. Alternatively, the fluids from the access wellbore 20 may be passed into the wellbore 104 via a suitable line 207' for treatment with the stored materials. The treated fluids may then be returned to the access wellbore 20 via the fluid control device 207. The fluids may be treated to alter the viscosity of the downhole fluids so as to reduce drag, change the chemical structure and/or chemical make-up of the downhole fluids, including the hydrocarbons.

In FIG. 4, the branch wellbore 106 is shown to contain equipment 222 and materials for processing and/or treating fluids downhole. Additionally, materials, such as chemicals and biological masses, generally denoted by numeral 223, may also be stored for use with the equipment 222. The fluids 219 may be passed from the access wellbore 20 into the wellbore 106 via suitable conduit 225a. The equipment 222 treats or processes the received fluids 219 and discharges the treated fluids either back into the access wellbore 20 or to another wellbore (not shown). The equipment 222 may include equipment for separating downhole fluids into various constituents, such as solids, water, oil and gas. In one embodiment, water may be separated from oil and gas. The separated water may be discharged into a dump wellbore (not shown) and the oil and gas may be returned to the access wellbore 20 for transportation to the surface. This allows for more efficient transportation of hydrocarbons from the producing formations.

In another embodiment, the wellbore 106 the equipment 222 may include equipment and for processing hydrocarbons downhole. Such equipment may utilize chemicals or other materials 223 for processing the hydrocarbons. As an example, production fluid may first be treated to remove any water and solids therefrom. The hydrocarbons may then be processed or treated to produce refined materials, such as octane, pentane, toluene, benzene, methanol, etc. Chemicals and/or biological masses 223 may be utilized to produce such materials. It should be noted that the processing wellbores, such as the wellbore 106, may be located at any other desired location, such as above each of the producing branch wellbores, such as wellbores 110*a*, 110*b* and 112. Additionally, multiple wellbores may be utilized to accomplish the processing and treatment of the fluids downhole. For example, one wellbore may be utilized to remove solids and water from the fluids and another wellbore for treating and/or processing the hydrocarbons. Thus, one of the purposes of such wellbores may be to eliminate or reduce the processing of fluids and/or hydrocarbons on the surface. Additionally, heating equipment and electrical equipment may be utilized in a branch wellbore to treat /or alter the state of a fluid downhole.

Still referring to FIG. 4, the branch wellbores, such as wellbore 106, may be utilized to contain equipment such as compressors for compressing any gaseous vapors in the fluid downhole. Such compressors may be utilized to compress the gas and discharge the compressed gas into a producing formation to aid the production of hydrocarbons from such a formation. Alternatively, the gas may be compressed into a liquid form and discharged into the access wellbore 20 for transportation to the surface.

In the present invention, the non-production wellbores 102, 104 and 106 are preferably, but not necessarily, formed entirely or substantially in the non-producing formations. The non-production wellbores are preferably utilized for performing desired operations downhole for improving the overall efficiency of recovering and/or processing hydrocarbon recovery, improving the life of the various wellbores and/or reducing costly operations at the surface.

Figure 5:
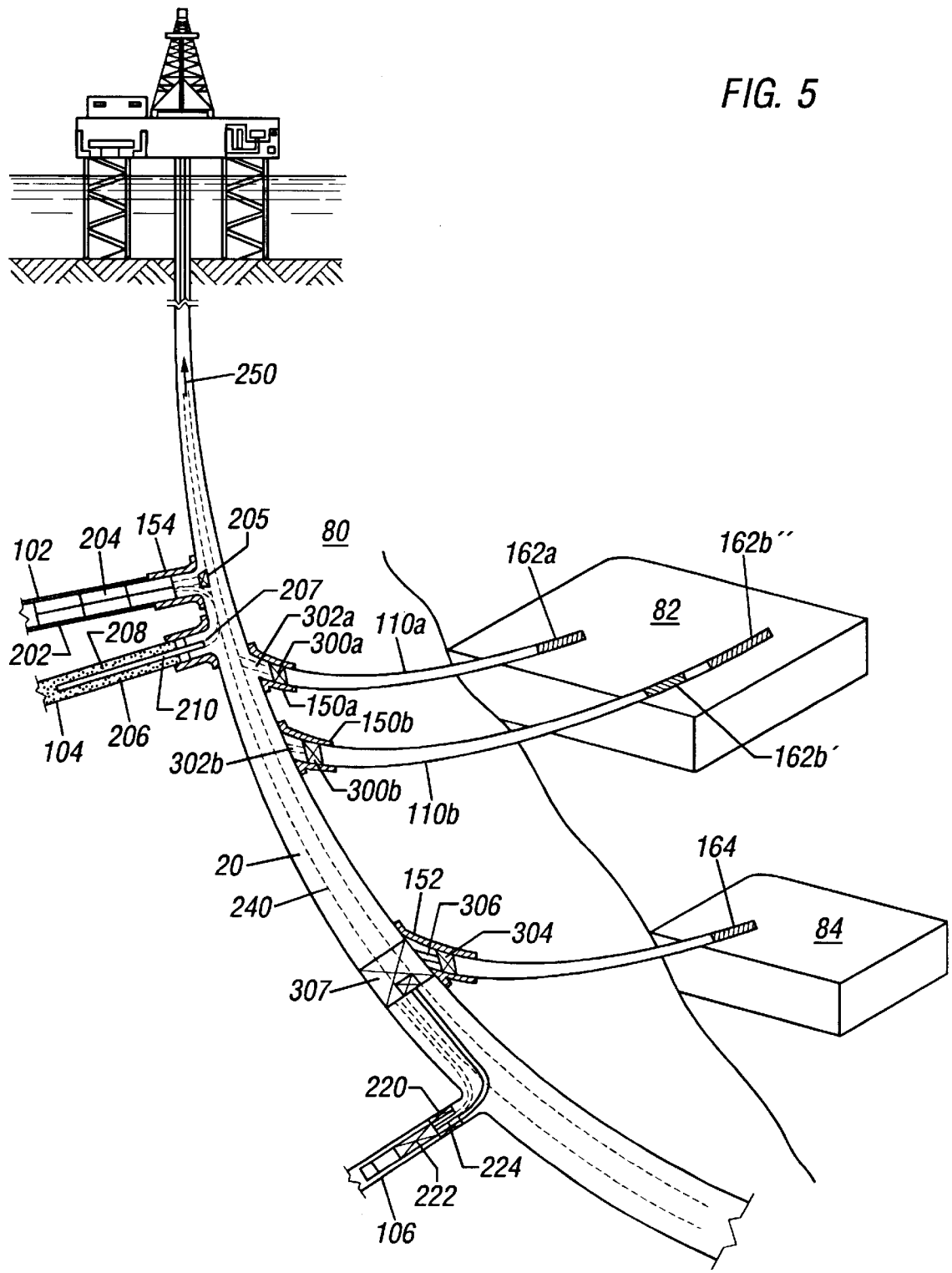
FIG. 5 is a schematic diagram showing the placement of flow control apparatus outside the primary wellbore.

FIG. 5 shows examples of the placement of flow control devices outside both the primary access wellbore 20 and the producing formations, and the placement of processing equipment in the primary access wellbore. In the example of FIG. 5, a separate fluid flow control device is placed in each of the production wellbores 110*a*, 110*b* and 112. Accordingly, flow control devices 300*a* and 300*b* are respectively placed in production wellbores 110*a* and 110*b* while a flow control device 304 is placed in the wellbore 112. The fluids recovered from the formations 82 and 84 pass to the access wellbore via these control devices. The fluid control devices 300*a*, 300*b* and 304 may be controlled from the surface. These flow control devices 300*a*, 300*b* and 304 are preferably remotely and independently controllable from the control unit 40. These flow control devices are adjusted to optimize the production of hydrocarbons from the various producing formations. This also allows shutting down a specified production branch wellbores to perform workover or service operations. The flow control devices 300*a*, 300*b* and 304 may be made to communicate with each other so that they may automatically adjust the fluid flow from their associated wellbore according to programmed instructions. These devices may also be programmed to completely close if certain predetermined adverse conditions occur. Additionally, these flow control devices may be operated as a function of certain parameters of interest, such as the pressure in the branch wellbores.

Still referring to FIG. 5, the above-noted devices may be deployed in the primary access wellbore 20. Devices placed in the primary wellbore are generally denoted by numeral 307. Such devices may be used for treating and/or processing fluids downhole as described above in reference to equipment 222 (FIG. 4). The equipment 307 may be utilized alone or in conjunction with materials (chemicals, etc.) stored in one of the branch wellbores, such as wellbore 106. The processing and treatment of the fluids may be done in the manner described earlier.

The use of non-producing wellbores to store devices and materials to perform desired operations, and the use of flow control devices outside the access wellbore allows the access wellbore to be maintained substantially free from devices that are not utilized for flowing fluids through the access wellbore. In other words, during the production of hydrocarbons, the access wellbore remains free of devices and materials which might negatively affect the flow of hydrocarbons to the surface.

The discussion thus far has related to the formation of multi-lateral wellbores from a primary wellbore that is formed primarily in a non-producing formation. In some applications, it may be desirable to form more than one access wellbore. FIG. 6 shows a manner of forming multi-lateral production wellbores from an access wellbore formed in the producing formation 82. In this configuration, the access wellbore 20 is formed as described above with in reference to FIG. 1. Additionally, the remaining wellbores are formed as described in reference to FIGS. 2–5 with the exception of wellbores 110*a* and 110*b*. Instead, a second access wellbore 402 is formed from the access wellbore 20 into the formation 82. A desired number of lateral wellbores 404*a*–*d* are then formed from the access wellbore 400 into the producing formation 82. Seals 406*a*–406*d* are formed between the access wellbore 402 and branch wellbores 404*a*–404*d* respectively. These seals are formed within the producing formation 82 by any suitable method known in the art. The branch wellbores are 404*a*–404*d* are respectively completed at zones 408*a*–408*d*. Fluid flow control devices are preferably placed in each of the producing branch wellbores to independently adjust the fluid flow through each such production wellbore. In each of the wellbore configurations herein the various fluid flow control devices may communicate with each other to control the corresponding fluid flows and/or may be controlled independently from a remote location such as the surface.

FIG. 7 shows an alternative method of forming wellbores. In this method, the primary wellbore 20 is formed away from some of the reservoirs, such as reservoirs 82 and 84, and drilled into some of the reservoirs, such as a reservoir 420. Hydrocarbons from the formations 82, 84 and 420 may be produced in the manner described above or by any other known method. Such a method is useful when it is desired to drill the primary access wellbore into one or more reservoirs, such as reservoir 420, and avoid drilling it in to one or more reservoirs, such as reservoirs 82 and 84. Such a method allows placing the primary access wellbore along an optimal path and allows the production of hydrocarbons from each such reservoir. It should be noted that additional access wellbores (not shown), similar to the wellbore 112, may be formed from the primary access wellbores into the reservoir 420.

Figure 8A:
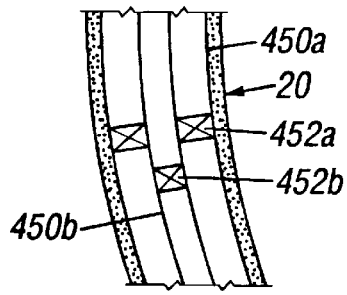
FIG. 8A is a schematic diagram of the primary access wellbore with a multi-concentric tubing for flowing fluids therethrough.
Figure 8B:
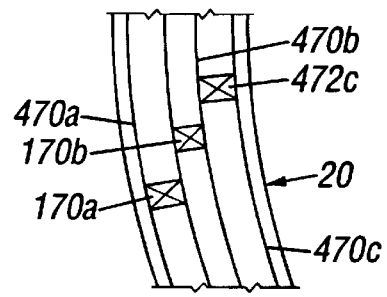
FIG. 8B is a schematic diagram of the primary access wellbore with multiple tubings placed therein for flowing fluids therethrough.

FIGS. 8A and 8B show the use of multi-paths for flowing fluids through the access wellbore 20. FIG. 8A shows two concentric conduits or tubings, having an outer tubing 450a and an inner tubing 450b. More than two concentric tubings may also be utilized. These concentric tubings may be utilized instead of the single tubing 240 as shown in FIGS. 4 and 5. Fluid flow control devices 252a and 252b are installed respectively in tubings 250a and 250b to control the flow of the fluids through their associated tubings. Such an arrangement allows for better controlling the fluid flow compared to the single tubing 240. New wellbores tend to produce larger amounts of hydrocarbons, which amounts gradually reduce as the producing formations are depleted. In such cases, for high production rates, the larger (outer) tubing 250a alone or in conjunction with the inner tubing 250b may be utilized for flowing fluids to the surface. This may be accomplished by opening the devices 252a and 252b. As the fluid flow decreases due to change in pressure or due to the increased amount of water production, one of the tubings may be closed. Additionally, this arrangement may be utilized to flow different materials to the surface. For example one of the tubings may be utilized to flow water and solids to the surface and the other tubing for flowing hydrocarbons.

FIG. 8B shows an alternative arrangement of utilizing multiple tubings in a wellbore. FIG. 8B shows the use of two different sized tubings 470a and 470b placed side-by-side in the access wellbore 20. Fluid flow control valves 472a and 472b are respectively placed in the tubings 470a and 470b for controlling the fluid flows through their respective tubings. The flow through these tubings may be controlled by independently controlling the flow control devices 472a and 272b. The flow control valves shown in FIGS. 8A and 8B are preferably remotely controllable from the surface. The above described arrangements provide for better control of the flow of fluid through the access wellbore 20 over the life of the producing wellbores without requiring secondary work to insert smaller tubings after the completion of the access wellbore 20.

Figure 9A:
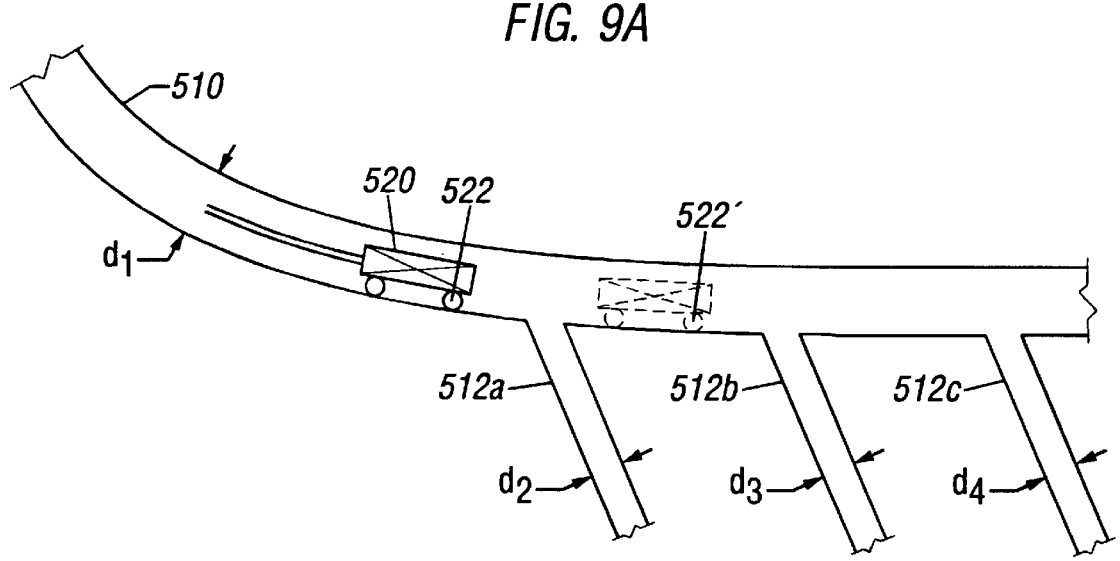
FIG. 9A is a schematic diagram of a transport system for use in placing devices and materials in the branch wellbores.
Figure 9B:
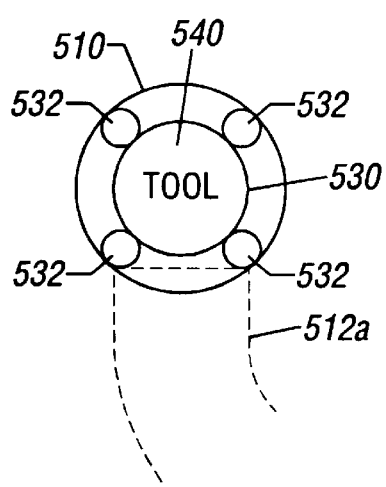
FIG. 9B is a side of the transport system of FIG. 9B.

FIGS. 9A and 9B show an apparatus which may be utilized for placing into and retrieving from any of the wellbores equipment and materials. FIG. 9A shows an access wellbore 510 having an inside diameter "$d_1$" and branch wellbores 512a–c with respective diameters $d_{2-4}$. Each of the diameters $d_{2-4}$ is smaller than the diameter $d_1$. The device or tool 520 to be moved into a desired branch wellbore is detachably attached or coupled to a carrier 522. This can be accomplished by making the size of the carrier 522 greater than each of the openings 514a–c. The dimensions of the carrier are such that it may be passed over the branch wellbores 512a–c. To convey the device 520 into a desired wellbore, the carrier 522 is coupled to a conveying device 524, such as a tubing. The device 520 is coupled to the carrier 522 or the conveying device 524. The conveying device is then moved in the wellbore 510 to position the carrier 522 before the desired wellbore. For example, if the device 522 is to be conveyed into the wellbore 512b, the carrier is positioned as shown by the dotted lines 522' before the wellbore 512b. The carrier 520 is then detached from the conveying device 524 while leaving the device 520 attached to the conveying device 524. The device 520 is then conveyed by the convening device into the wellbore 512b. Since the device 52 is smaller than the opening of the wellbore 512b, the device 520 may be conveyed in to the wellbore by utilizing any of the techniques known in the art. After the device 520 has been properly positioned in the wellbore 512b, the conveying device is detached from the device 520 and used to retrieve the carrier 522 from the access wellbore 510. To retrieve a device from any of the wellbores, the process described above is reversed. Fluids, such as chemicals and other materials, may also be conveyed into a desired wellbore in the manner described above.

In an alternative embodiment, as shown in FIG. 9B, the carrier 540 includes a number of adjustable members 532, each member preferably being independently adjustable radially. Such members may be mechanically adjustable or remotely adjustable so that they expand and collapse about the body 530. To convey a device, the adjustable members are moved to suitable positions to convey the device 520. If remotely adjustable members are utilized, the carrier may not need to be detached prior to conveying the device into a destination wellbore. If the destination wellbore is sufficiently large to accommodate both the carrier and the device to be conveyed, then the combination may be conveyed into the destination wellbore and the carrier detached after positioning the device in the destination wellbore. Such a carrier may be utilized to retrieve a device from the wellbore with the members collapsed to the body, which are then expanded to pass over other branch wellbores and repositioned to convey the device into a second wellbore.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method for recovering hydrocarbons form earth formations, said method comprising:
   (a) forming a primary wellbore into an earth formation for recovering the hydrocarbons;
   (b) forming a branch wellbore for storing therein a retrievable device adapted for use downhole;
   (c) storing the retrievable device in the branch wellbore; and
   (d) retrieving the stored device from the branch wellbore and performing an operation therewith downhole.

2. The method of claim 1 wherein the storing of the retrievable device in the branch wellbore is performed by conveying the retrievable device into the branch wellbore by a tubing.

3. The method of claim 1 further comprising installing a closable opening between the branch wellbore and the primary wellbore.

4. The method of claim 1, wherein the stored device is selected from a group consisting of a (a) bottomhole assembly and (b) flow control device.

5. The method of claim 1, wherein the stored device is a device for drilling wellbores.

6. The method of claim 1, wherein the stored device is a perforating device.

7. The method of claim 1, wherein the stored device is a device useful for performing a completion operation in a wellbore.

8. The method of claim 1, wherein the stored device is a device for performing workover of a wellbore.

9. The method of claim 1, wherein the stored device is a device for taking measurements relating to at least one of (a) a wellbore parameter, (b) a formation parameter, (c) a bed boundary parameter, (d) a drilling parameter, and (e) a production parameter.

10. The method of claim 1, wherein the stored device is a device for compressing gas.

11. The method of claim 1, wherein the branch wellbore is formed entirely within a non-producing formation.

12. The method of claim 1, wherein the stored device is remotely controlled from a surface location to cause the stored device to move from the branch wellbore to perform a predetermined function downhole.

13. The method of claim 1, wherein the stored device is self-propelled.

14. The method of claim 1, wherein the stored device is actuated upon the occurrence of a predetermined condition and directs itself to perform a predetermined operation downhole.

15. A method for recovering hydrocarbons form one or more producing zones, comprising:
   (a) forming a primary wellbore substantially in a non-producing formation;
   (b) forming at least one branch wellbore into a producing zone for producing hydrocarbons therefrom, said at least one branch wellbore intersecting the primary wellbore;
   (c) installing a fluid flow control device in the at least one branch wellbore for controlling the flow of the hydrocarbons from the branch wellbore into the primary wellbore; and
   (d) producing the hydrocarbons from the producing zone by flowing such hydrocarbons through the primary wellbore while maintaining the primary wellbore substantially free of flow control devices.

16. The method of claim 15, wherein flow control devices are controlled as a function of a downhole parameter to optimize the production of the hydrocarbons from said plurality of branch wellbores.

17. A method for producing hydrocarbons form a producing zone, comprising:
   (a) forming a primary wellbore substantially in a non-producing formation;
   (b) forming a branch wellbore into the producing zone for producing hydrocarbons therefrom, said branch wellbore intersecting the primary wellbore;
   (c) forming a sealed junction at the intersection of the primary wellbore and the branch wellbore, said junction formed entirely outside the producing zone;
   (d) forming a storage wellbore intersecting with the primary wellbore for storing therein a retrievable device for later use; and
   (e) producing the hydrocarbons from the producing zone by flowing such hydrocarbons through the primary wellbore.

18. The method of claim 17 further comprising placing a flow control device in the branch wellbore for controlling the flow of the hydrocarbons from the producing zone into the primary wellbore.

19. The method of claim 17, wherein the primary wellbore is substantially free of equipment which is not utilized for flowing hydrocarbons through the primary wellbore.

20. A method for forming multi-lateral wellbores for producing hydrocarbons from subterranean formations, said method comprising:
   (a) forming a primary wellbore in a first formation;
   (b) forming a plurality of lateral wellbores intersecting the primary wellbore, wherein at least one lateral wellbore is formed into a producing zone for producing hydrocarbons therefrom and at least one lateral wellbore is formed primarily in the first formation;
   (c) placing a retrievable device useful for performing work at a later time in the at least one lateral wellbore formed in the first formation and storing a retrievable device therein for performing work downhole;
   (d) completing the wellbores in the production zone and producing the hydrocarbons from the producing zone by flowing such hydrocarbons through the primary wellbore; and
   (e) retrieving the stored devices and performing an operation therewith downhole.

21. A method for recovering hydrocarbons from a producing zone, said method comprising:
   (a) forming a primary wellbore for recovering hydrocarbons from the producing zone; and
   (b) forming a branch wellbore for treating downhole the hydrocarbon produced from the producing zone to change a property of the produced hydrocarbon.

22. The method of claim 21 further comprising providing in the branch wellbore equipment for initiating the change in the property of the hydrocarbon.

23. The method of claim 21, wherein the property of the fluid changed is a physical property.

24. The method of claim 21, wherein the property of the fluid changed is the viscosity of the hydrocarbons.

25. The method of claim 21, wherein the property of the hydrocarbon changed is a chemical property.

26. The method of claim 21 further comprising providing in the branch wellbore a chemical for initiating the change in the property of the hydrocarbon.

27. The method of claim 21 further providing in the branch wellbore an enzyme for initiating the change in the property of the hydrocarbon.

28. A method for producing a hydrocarbon form a sub-surface formation comprising:
   (a) forming a wellbore into the sub-surface formation for producing the hydrocarbon therefrom and
   (b) converting downhole the hydrocarbon produced into a refined material having chemical structure different from the hydrocarbon produced from the sub-surface formation.

29. The method as specified in claim 28, wherein the refined material is octane.

30. The method as specified in claim 28, wherein the refined material is benzene.

31. The method as specified in claim 28, wherein the refined material is toluene.

32. The method as specified in claim 28, wherein the refined material is methanol.

33. The method as specified in claim 28, wherein the conversion of the hydrocarbon is done in a branch wellbore.

34. A method for recovering hydrocarbons form a producing zone, comprising:
   (a) forming a primary wellbore;
   (b) forming a branch wellbore into the producing zone for producing the hydrocarbons;
   (c) producing hydrocarbons from the producing zone via the branch wellbore; and
   (d) compressing gas present in the hydrocarbons produced from the producing zone by a compressor placed downhole.

35. The method as specified in claim 34, wherein the compressor is placed in the primary wellbore.

36. The method as specified in claim 34, wherein:
   (i) the gas is compressed to a liquid state; and
   (ii) the liquified gas is returned to the primary wellbore.

37. The method as specified in claim 34, wherein the compressed gas is returned to the producing zone to improve the production of hydrocarbons from the producing zone.

38. A method for forming wellbores, comprising:
   (a) forming a primary wellbore into a first formation spaced apart from a boundary of a target formation at least a predetermined distance determined while drilling the primary wellbore; and (b) forming a branch wellbore into the target formation for recovering hydrocarbons therefrom, said production wellbore intersecting the primary wellbore.

39. The method of claim 38, wherein the location of the boundary of the target formation is determined by utilizing acoustic measurements.

40. The method of claim 39, wherein the acoustic measurements are made by sensors disposed on a drilling assembly utilized for forming the primary wellbore.

41. The method of claim 38, wherein the location of the boundary of the target formation is determined by utilizing seismic measurements.

42. A method for forming wellbores, comprising:

(a) forming a first access wellbore into a non-producing formation;

(b) forming a second access wellbore from the first access wellbore into a producing formation, said second access wellbore intersecting with the first access wellbore;

(c) forming a branch production wellbore from the second access wellbore into the producing formation; and (d) producing hydrocarbons from the producing formation.

43. The method of claim 42, wherein hydrocarbons are produced via the first and second access wellbores.

44. The method of claim 42 further comprising maintaining the first access wellbore substantially free of equipment which is not utilized for flowing hydrocarbons therethrough.

45. A method for transporting a working device into a desired lateral wellbore selected from a plurality of lateral wellbores intersecting with an access wellbore said method comprising:

(a) detachably attaching the working device to a transport device, said transport device adapted to sass over lateral wellbores preceding the desired lateral wellbore while said working device being adapted to be inserted into the desired lateral wellbore;

(b) conveying the transport device carrying the working device into the access wellbore past each of the lateral wellbores preceding the desired lateral wellbore;

(c) detaching the transport device from the working device prior to the working device reaching the desired lateral wellbore; and (d) moving the working device until it is placed in the desired lateral wellbore.

46. The method of claim 45, wherein the transport device is conveyed by a coiled tubing.

47. The method of claim 46, wherein the working device is detachably mounted on the transport device.

48. The method of claim 45 further comprising retrieving the detached transport device from the access wellbore.

49. Apparatus for selectively accessing from a surface location a desired lateral wellbore selected from a plurality of wellbores which intersect with an access wellbore having a known diameter and drilled into a subterranean formation, wherein each lateral wellbore communicates with the access wellbore through a separate opening between such lateral wellbore and the access wellbore and wherein the largest dimension of each such opening is smaller than the diameter of the access wellbore, comprising:

(a) a conveying member suitable for conveying a working device from the surface location into the access wellbore; and (b) a transport device having dimensions smaller than the diameter of the access wellbore and attached to the conveying member, said transport device having adjustable members for aiding in conveying the working device attached thereto into a desired access wellbore.

50. Apparatus for selectively accessing from a surface location a desired lateral wellbore from a plurality of wellbores which intersect with an access wellbore having a known diameter drilled into a subterranean formation, wherein each lateral wellbore communicates with the access wellbore through a separate opening between such lateral wellbore and the access wellbore and wherein the largest dimension of each such opening is smaller than the diameter of the access wellbore, comprising:

(a) a conveying apparatus suitable for conveying devices from the surface location into the access wellbore;

(b) a transport device detachably connected to the conveying apparatus for conveying the transport device into the access wellbore, the transport device having outside dimensions greater than the size of the opening of each of the lateral wells preceding the desired lateral wellbore; and (c) a working device attached to the conveying apparatus near the transport device, said working device having outside dimensions smaller that the opening of the desired wellbore.

51. A method for recovering hydrocarbons form a producing zone, comprising:

(a) forming a primary wellbore substantially in a non-producing formation;

(b) forming a branch wellbore into the producing zone, said branch wellbore intersecting the primary wellbore;

(c) completing the branch wellbore for producing hydrocarbons therefrom;

(d) placing a concentric tubing in the primary wellbore, said concentric tubing having an inner tubing and an outer tubing (e) recovering hydrocarbons from the producing zone via the branch wellbore; and (f) flowing the produced hydrocarbons to the surface by independently controlling flow of the produced hydrocarbons through the inner and outer concentric tubings.

52. The method as specified in claim 51, wherein the inner tubing includes a fluid control device for controlling flow of the fluid through the inner tubing.

53. The method as specified in claim 52, wherein the outer tubing includes a fluid control device for controlling flow of the fluid through the outer tubing.

54. A method for producing hydrocarbons from an earth formation, comprising:

(a) forming a wellbore in the earth formation for producing hydrocarbons therefrom; and (b) providing a compressor downhole for compressing gas to aid the production of the hydrocarbons from the earth formation.

55. The method of claim 54, wherein the compressor is placed at one of a suitable location in the primary wellbore and a suitable location in a branch wellbore formed from the primary wellbore.

56. A method for recovering hydrocarbons from an earth formation, comprising:

(a) forming a wellbore in the earth formation for producing the hydrocarbons therefrom; and (b) compressing downhole gas present in the hydrocarbons produced from the earth formation.

57. The method of claim 56 further comprising discharging the compressed vapors into one of (a) a selected location in the earth formation to aid the production of the hydrocarbons, (b) the primary wellbore to aid the flow of fluids through the primary wellbore, and (c) a branch wellbore formed from the primary wellbore.

* * * * *

UNITED STATES PATENT AND TRADEMARK OFFICE
CERTIFICATE OF CORRECTION

PATENT NO : 5,868,210
DATED : February 9, 2000
INVENTOR(S) : Michael H. Johnson, Joseph F. Donovan and Daniel Turick It is certified that error appears in the above-identified patent and that said Letters Patent is hereby corrected as shown below:

Column 14, line 28 please delete "form" and insert therefor --from--.

Column 15, line 9 please delete "form" and insert therefor --from--.

Column 15, line 29 please delete "form" and insert therefor -- from--.

Column 16, line 27 please delete "form" and insert therefor --from--.

Column 17, line 36 please delete "sass" and insert therefor --pass--.

Column 18, line 28 please delete "form" and insert therefor --from--.

Signed and Sealed this

Twentieth Day of March, 2001

Attest:

NICHOLAS P. GODICI

Attesting Officer    Acting Director of the United States Patent and Trademark Office